June 18, 1968  J. G. FERRAND  3,388,430
METHODS OF AND MACHINES FOR CONTINUOUSLY MOULDING AND/OR
POLYMERISING ARTICLES MADE FROM PLASTICS MATERIAL
Filed May 5, 1965  3 Sheets-Sheet 3
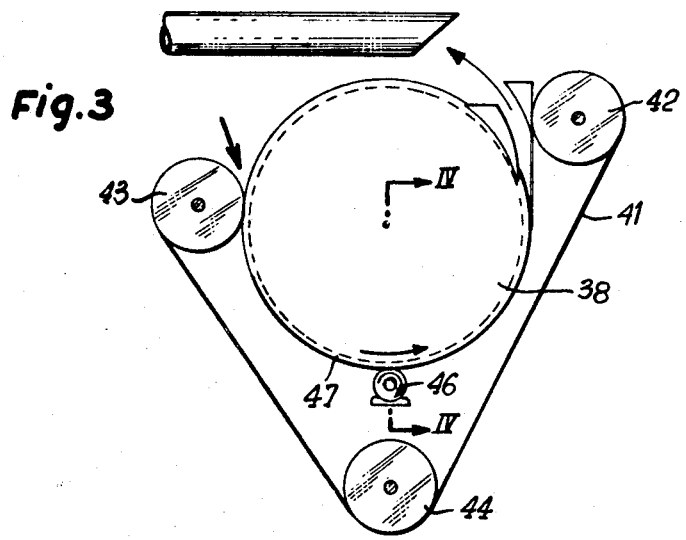
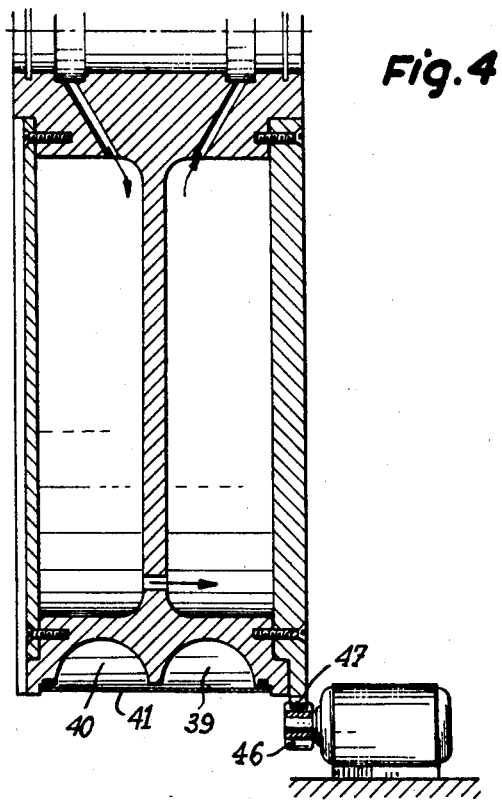
INVENTOR
JEAN-GEORGES FERRAND
BY
Bacon & Thomas
ATTORNEYS United States Patent Office 3,388,430
Patented June 18, 1968

3,388,430
METHODS OF AND MACHINES FOR CONTINU-
OUSLY MOULDING AND/OR POLYMERISING
ARTICLES MADE FROM PLASTICS MATERIAL
Jean Georges Ferrand, Billieres, France, assignor to
Societe Anonyme dite: Societe Nationale des Petroles
d'Aquitaine, a corporation of France
Filed May 5, 1965, Ser. No. 453,383
Claims priority, application France, May 6, 1964,
973,466
5 Claims. (Cl. 18—26)

ABSTRACT OF THE DISCLOSURE

A machine for molding a continuous article of plastic, having a frame with a rotatable molding drum mounted therein. A peripheral cavity is formed on the lateral surface, and is closed over part of its length by an endless band passing over the drum in contact with at least two toric sealing elements mounted on the drum on either side of the cavity. Guiding and returning means are provided for the band and an intake for fluid material to be molded is provided in the vicinity of the meeting point of the band with the drum. The drum is chambered for circulating heating fluid therethrough and a blade for removing the molded article is disposed in the cavity on the opposite side of the drum from the intake for the material to be molded.

---

The present invention relates to a method of and machine for continuously moulding and/or polymerising articles made from plastics material.

In the manufacture of flat continuous belts made from plastics material, it has been proposed to use a drum and an endless belt made of steel, between which are compressed the articles made of plastics material and which are formed by a continuous movement. However, up to the present, only flat belts or a covering of plastics material for a continuous support material have been manufactured by this process.

According to the present invention, a method of producing articles of any shape moulded from plastics material is carried out by forming cavities in a drum, said cavities being closed by a continuous metal belt and in which a mixture of plastics material to be polymerised is imprisoned.

The embodiment of the invention to be hereinafter described relates to the continuous manufacture of nylon 6 by polymerisation of caprolactam in the presence of sodium as a catalyst and diisocyanate toluene as an initiator.

The moulding drum, which is heated internally by a circulation of hot fluid, enables a continuous polymerisation to be effected and avoids any contact of the reactional mixture with the hot fluid. Since the aim is to manufacture beadings from nylon 6, the cavity in the moulding drum may be continued in the form of a groove so as to obtain a beading which may be loosened from its mould, without having to cool it, by using the stiffness of the nylon 6. This stiffness is obtained by polymerising the reactional mixture on a curved profile and any variation of the radius of curvature enables the finished product to be loosened. This variation of curvature is, for example, obtained by means of a blade arranged in the groove of the drum.

In another embodiment relating to an industrial machine, in order to avoid sawing before pounding, the lengths of nylon 6 may be limited by providing narrow portions in the section of the beading by means fixed on the belt, so that having utilised the stiffness on the blade in order to loosen the beading, the same stiffness may be used in order to cut it up into pellets or into short round bars.

The machine according to the invention may be made from ordinary steel, which enables its construction to be simplified and its cost price to be substantially economical.

The method according to the invention is characterised in that a mixture comprising at least a plastics material and a catalyst is imprisoned in one or more cavities located in the peripheral surface of a heated, rotatable drum by an endless belt passing around the drum, in such a manner that the mixture is moulded and/or polymerised on a curved profile, whilst the drum and belt are moved continuously and simultaneously.

The invention also has for an object to provide a machine for carrying out the above method, in which a continuous cavity in the form of an annular groove located in the peripheral surface of the moulding drum is closed by an endless belt which co-operates with at least two toric sealing joints engaged in two annular grooves in the drum, said joints being in contact with the two edges of the belt.

In order that the present invention may be more clearly understood, reference will now be made to the accompanying drawings, in which:

FIGURE 3 is an elevational view of another embodiment of machine according to the invention, and FIGURE 4 is an enlarged sectional view taken along the line IV—IV of FIGURE 3.

Figure 1:
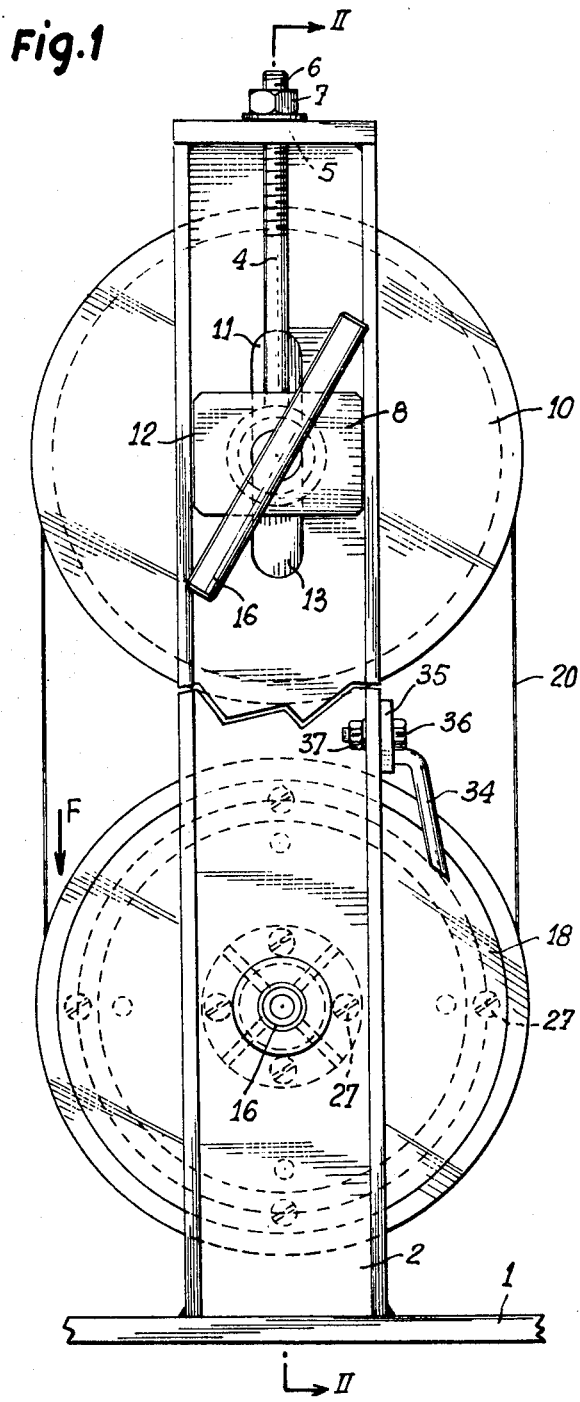
FIGURE 1 is an elevational view of a moulding machine according to the invention.
Figure 2:
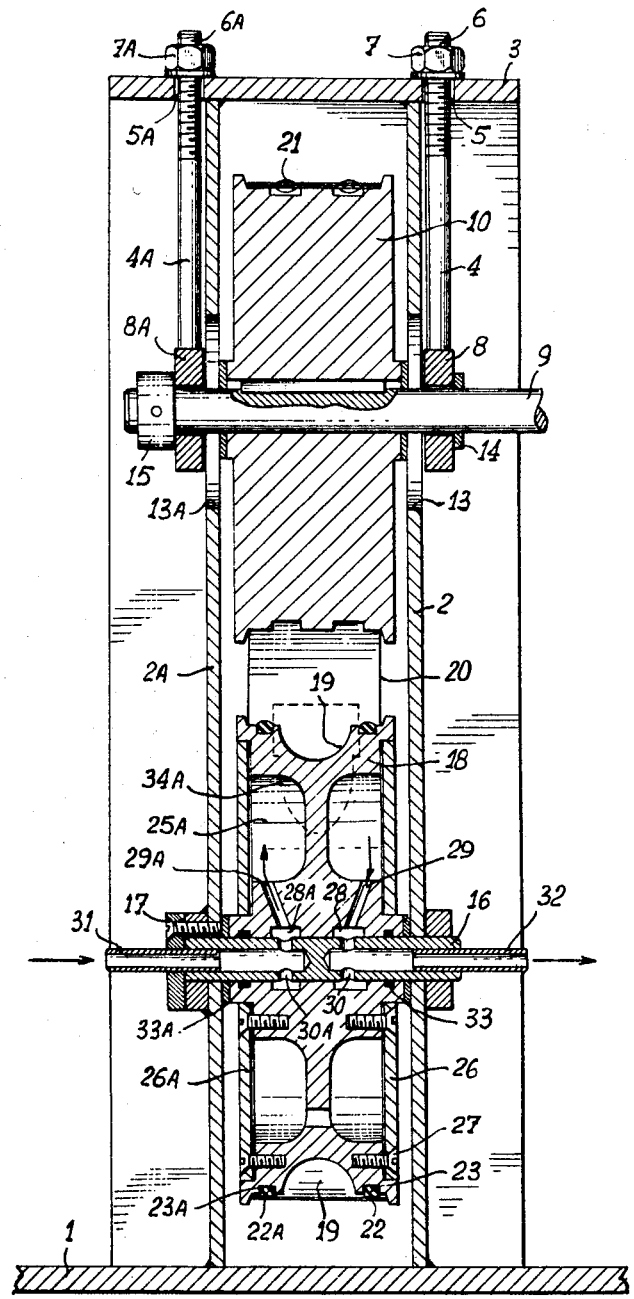
FIGURE 2 is a sectional view of the moulding machine taken along the line II—II of FIGURE 1.

The machine for continuously moulding and/or polymerising articles made from plastics material shown in FIGURES 1 and 2 comprises a frame consisting of a base plate 1 on which are secured two U-shaped uprights 2, 2A which are held at their upper ends by a plate 3 fixed to the two uprights. Supporting rods 4, 4A are engaged in apertures 5, 5A in the upper plate 3 and are held on the latter by their threaded ends 6, 6A on to which are screwed nuts 7, 7A. At their ends opposite to the threads, the rods 4, 4A have bearings 8, 8A which receive a shaft 9 mounted for rotation in the bearings and to which is keyed a driving drum 10.

The bearings 8, 8A, which are arranged between the flanges of the U-shaped uprights 2, 2A have edges 11, 12 co-operating with the flanges of the U-shaped uprights so as to ensure that the shaft 9 is guided and held. The shaft moves in apertures 13, 13A to enable variation of its position with respect to the upper plate 3 by screwing or unscrewing of the nuts 7, 7A. The shaft 9, which is held on the bearings 8, 8A by means of thrust-collars 14, 15 is rotated by a drive-motor through a transmission of known type (not shown in the drawings).

At the lower part of the frame, a shaft 16 is fixed to the uprights 2, 2A by means of screws 17 and carries a drum 18 which is mounted so as to rotate on said shaft. This drum 18 has, in its peripheral surface, a continuous cavity 19 in the form of a groove of semi-circular cross-section. However, it is to be understood that this cross-section could be of any other shape, particularly rectangular.

The drum 10 is connected to the drum 18 so as to drive the latter by means of a belt 20, preferably made of steel and the ends of which are connected together by means of rivets 21, or by soldering to form an endless belt. The endless belt 20, which passes about the drum 18, overlies the cavity 19 in the manner of a cover which is sealed by two toric joints 22, 22A located in two ring grooves 23, 23A in the drum 18.

The drum 18 is constituted by a member 24 having annular cavities 25, 25A closed by two cheek plates 26, 26A secured to the member 24 by means of screws 27. The cavities 25 are in communication with two annular chambers 28, 28A, arranged about the axis of rotation of the shaft 16, through conduits 29, 29A.

Conduits 31, 32 formed in the shaft 16 communicate through apertures 30, 30A with the annular chambers 28, 28A, and these conduits provide for the arrival and departure of hot fluid which circulates in the cavities 25, 25A and heats the drum 18. Joints 33, 33A ensure the seal between the shaft 16 and the interior of the drum 18.

A member for loosening the finished products, which member is constituted by a blade 34 engaged in the base of the cavity 19, is mounted on the flanges of the uprights 2, 2A by means of a plate 35 fixed by bolts 36 provided with nuts 37.

For moulding and polymerising the above-mentioned reactional mixture, the following operations are effected:

When the drum 18 is being rotated by the drum 10 through the endless belt 20 and hot fluid is circulating within the cavities 25, 25A of the drum 18 via the conduits 31, 32, the reactional mixture is poured, in the presence of a slight current of nitrogen, between the belt 20 and the drum 18 into the continuous cavity 19 in the direction of the arrow F (FIGURE 1). The plastics material is imprisoned in the cavity 19 and undergoes a polymerisation while the drum 18 rotates through a half-revolution, the polymerisation time being variable as a function of the speed of rotation of the drum. When the belt 20 separates from the drum 18, the beading made from plastics material, particularly nylon 6, can be removed from the mould by means of the blade 34 which modifies the radius of curvature of the solid obtained.

FIGURES 3 and 4 show another embodiment of a continuous moulding machine according to the invention for an industrial application having a large output.

In this device, a moulding drum 38 is used, which is constructed in the same manner as the drum 18 as far as the method of heating is concerned, but which is provided with two continuous moulding cavities 39, 40 which enable the output of plastics material obtained to be increased. It will be obvious that a greater number of cavities can be used, this being as a function of the possibilities of exploitation of the machine.

The endless belt 41, which passes about the drum along a semi-circumference thereof, acts in the same manner as in the preceding embodiment in order to close the cavities 39, 40. This endless belt 41 is guided in its position outside the drum on rollers or small drums 42, 43, 44.

Finally, the drum is driven directly by a motor 45 to the end of the shaft of which is keyed a pinion 46 which engages with bevelled teeth 47 on the periphery of one of the cheek plates of the drum 38.

Whilst particular embodiments have been described, it will be understood that various modifications can be made without departing from the scope of the invention as defined by the appended claims.

I claim:

1. A machine for the continuous molding of polymerisable plastic articles comprising: a frame; a rotatable molding drum mounted on said frame and having at least one continuous peripheral groove extending over the circumference thereof; an endless band, passing onto the drum and closing the groove over part of its length; at least two toric sealing elements carried by the drum on either side of said groove and in contact with the band; means for guiding said band off from and returning it onto said drum; means for simultaneously driving said molding drum and said band including a plurality of teeth formed on one of the edges of the molding drum, a drive pinion engaged with said teeth and a drive motor connected with said drive pinion; and an intake for fluid material to be molded in the vicinity of the meeting point where the band passes onto the molding drum.

2. A continuous molding machine as set forth in claim 1, wherein a blade for disengaging the finished product from the groove is fixed on the frame in the vicinity of the point where the band leaves the drum with a portion thereof extending into said groove.

3. The continuous molding machine of claim 1 in which the peripheral groove is of semi-circular cross section.

4. The continuous molding machine of claim 1 wherein the lateral surface of the molding drum contains a plurality of parallel grooves of semi-circular cross section.

5. The continuous molding machine of claim 1, wherein closed cavities are formed in said molding drum for the circulation of hot fluid therethrough, and including means for connecting said cavities to a source of hot fluid.

References Cited

UNITED STATES PATENTS

| 2,312,049 | 2/1943 | Pfeiffer | 18—21 XR |
| 2,815,573 | 12/1957 | Trelease | 18—21 XR |
| 2,932,852 | 4/1960 | Melville et al. | 18—9 |
| 2,949,639 | 8/1960 | Woodward | 18—21 XR |
| 2,965,923 | 12/1960 | Smith et al. | 18—10 XR |
| 3,010,148 | 11/1961 | Dashex | 18—9 |
| 3,039,137 | 6/1962 | Smith et al. | 18—9 XR |

WILLIAM J. STEPHENSON, *Primary Examiner.*